(12) United States Patent
Sakuramoto

(10) Patent No.: US 11,845,237 B2
(45) Date of Patent: Dec. 19, 2023

(54) SYSTEMS AND METHODS FOR AUTOMATIC DIE ADJUSTMENT

(71) Applicant: GM GLOBAL TECHNOLOGY OPERATIONS LLC, Detroit, MI (US)

(72) Inventor: Carlos Yuji Sakuramoto, São Paulo (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 17/729,509

(22) Filed: Apr. 26, 2022

(65) Prior Publication Data

US 2023/0339202 A1    Oct. 26, 2023

(51) Int. Cl.
  *B21D 22/02* (2006.01)
  *B30B 15/14* (2006.01)
  *H02P 29/00* (2016.01)
  *B30B 15/02* (2006.01)
  *B30B 15/28* (2006.01)

(52) U.S. Cl.
  CPC ............ *B30B 15/148* (2013.01); *B21D 22/02* (2013.01); *B30B 15/02* (2013.01); *H02P 29/00* (2013.01); *B30B 15/28* (2013.01)

(58) Field of Classification Search
  CPC ........ B21D 22/02; B30B 15/148; B30B 15/02; B30B 15/28; H02P 29/00
  See application file for complete search history.

(56) References Cited

U.S. PATENT DOCUMENTS

| | | | | |
|---|---|---|---|---|
| 4,348,943 A | * | 9/1982 | Bouyoucos | ........... B30B 15/161 91/417 R |
| 5,129,317 A | * | 7/1992 | Gloe | ................... B30B 15/28 100/231 |
| 6,192,733 B1 | * | 2/2001 | Long | .................... B30B 1/42 72/430 |

* cited by examiner

*Primary Examiner* — Teresa M Ekiert

(57) ABSTRACT

A die of a stamping press includes: an upper portion including one or more first features and first bores that extend partially through the upper portion; magnets disposed within the first bores, respectively; a lower portion including one or more second features that are complementary to the first features and second bores at locations, respectively, that extend partially through the lower portion; and magnetic flux sensors that are disposed within the second bores, respectively, and that are adjacent to the magnets, respectively, and that are configured to measure distances between the upper and lower portions at the locations.

20 Claims, 6 Drawing Sheets

SYSTEMS AND METHODS FOR AUTOMATIC DIE ADJUSTMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to machine (stamping) presses and dies and more particularly to systems and methods for measuring distances between upper and lower portions of a stamping press.

Stamping presses can be used in many different industries. For example, a stamping press can be used in metalworking to shape or cut metal by deforming the metal with upper and lower parts of a die. The metal is positioned between the upper and lower parts of the die, which have female and male shaped portions. One or both of the upper and lower parts of the die are moved toward each other to deform the metal to the shape of the upper and lower parts of the die.

A bolster plate may be mounted on top of a press bed. A lower portion of the die may be attached to the bolster plate. An upper portion of the die is attached to a ram in the example of the upper portion of the die moving toward the lower portion, and the lower portion being fixed.

SUMMARY

In a feature, a stamping press system includes: a die including: an upper portion including one or more first features and first bores that extend partially through the upper portion; magnets disposed within the first bores, respectively; a lower portion including one or more second features that are complementary to the first features and second bores at locations, respectively, that extend partially through the lower portion; and magnetic flux sensors that are disposed within the second bores, respectively, and that are adjacent to the magnets, respectively, and that are configured to measure distances between the upper and lower portions at the locations; electric motors configured to at least one of: vertically lower the upper portion toward the lower portion; and vertically raise the lower portion toward the upper portion; and a motor control module configured to control application of power to the electric motors.

In further features, the motor control module is configured to control application of power to the electric motors during the at least one of the vertical lowering and the vertical raising based on at least one of the distances.

In further features, the motor control module is configured to adjust power applied to at least one of the electric motors based on adjusting at least one of the distances toward to at least one other one of the distances.

In further features, the magnets are adhered within the first bores, respectively.

In further features, the magnetic flux sensors are threaded onto threads on an inner diameter of the second bores.

In further features, a gap module is configured to generate a map of the distances at the locations, respectively.

In further features, the motor control module is configured to control application of power to the electric motors during the at least one of the vertical lowering and the vertical raising based on the map.

In further features, the magnetic flux sensors include Hall Effect sensors.

In further features, a fault module is configured to selectively indicate the presence of a fault based on the distances.

In further features, the fault module is configured to, when the fault is present, indicate the presence of the fault via an output device that at least one of outputs sound and outputs light.

In further features, the motor control module is configured to disconnect the electric motors from power when fault is present.

In further features, planes of faces of the magnets are approximately parallel to tangents to the upper portion at centers of the location of the magnets, respectively.

In a feature, a die of a stamping press includes: an upper portion including one or more first features and first bores that extend partially through the upper portion; magnets disposed within the first bores, respectively; a lower portion including one or more second features that are complementary to the first features and second bores at locations, respectively, that extend partially through the lower portion; and magnetic flux sensors that are disposed within the second bores, respectively, and that are adjacent to the magnets, respectively, and that are configured to measure distances between the upper and lower portions at the locations.

In further features, the magnets are adhered within the first bores, respectively.

In further features, the magnetic flux sensors are threaded onto threads on an inner diameter of the second bores.

In further features, the magnetic flux sensors include Hall Effect sensors.

In further features, planes of faces of the magnets are approximately parallel to tangents to the upper portion at centers of the location of the magnets, respectively.

In a feature, a method includes: by electric motors of a stamping press, selectively at least one of: vertically lowering an upper portion of a die toward a lower portion of the die; and vertically raising the lower portion of the die toward the upper portion of the die; and controlling the application of power to the electric motors, the die including: an upper portion including one or more first features and first bores that extend partially through the upper portion; magnets disposed within the first bores, respectively; a lower portion including one or more second features that are complementary to the first features and second bores at locations, respectively, that extend partially through the lower portion; and magnetic flux sensors that are disposed within the second bores, respectively, and that are adjacent to the magnets, respectively, and that are configured to measure distances between the upper and lower portions at the locations.

In further features, the controlling the application of power to the electric motors includes controlling application of power to the electric motors during the at least one of the vertical lowering and the vertical raising based on at least one of the distances.

In further features, the controlling the application of power to the electric motors includes adjusting power applied to at least one of the electric motors based on adjusting at least one of the distances toward to at least one other one of the distances.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Upper and lower portions of a die used in a stamping press have complementary shapes. For example, the lower portion of the die may have a male protrusion that extends upwardly toward the upper portion of the die. The upper portion of the die may have a female shape depression into which the male protrusion is to extend. The upper and lower portions of the die may be aligned via a costly and time consuming process by a diemaker to avoid the lower portion of the die from contacting the upper portion of the die at one or more locations.

The present application involves the upper portion of the die including magnets and the lower portion of the die including electromagnetic sensors configured to determine distances between the upper and lower portions of the die based on magnetic fields produced by the magnets. A gap module generates a map of the distances between the upper and lower portions of the die based on the distances measured by the sensors. An adjustment of the upper and/or lower portions of the die can be automatically triggered based on one or more of the distances and/or when the map deviates from a reference map by at least a predetermined amount.

Figure 1:
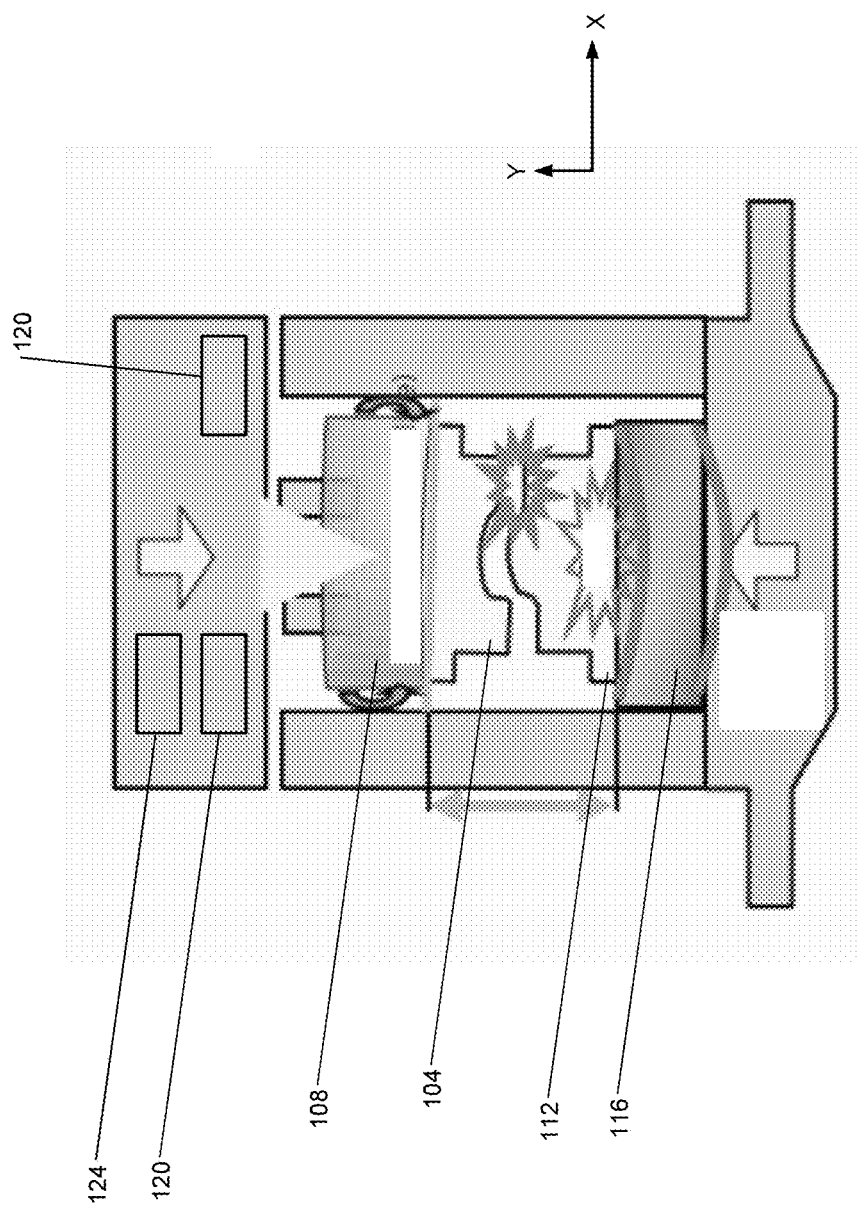
FIG. 1 is a perspective view of an example stamping press.

FIG. 1 is a side perspective view of an example stamping press. An upper portion 104 of a die is mounted to an upper portion 108 of the stamping press. A lower portion 112 of the die is mounted to a lower portion 116 of the stamping press. In this example, the upper portion 108 of the stamping press (and therefore the upper portion of the die 104) move vertically upwards and downwards.

The upper and lower portions 104 and 112 of the die stamp a substrate (e.g., sheet metal) into a shape of the upper and lower portions 104 and 112 of the die when the upper portion 104 of the die is moved (vertically lowered) toward the lower portion 112 of the die. While the example of the upper portion 104 moving is provided, the lower portion 112 may alternatively be vertically moveable or both of the upper and lower portions 104 and 112 may be moveable.

The upper and lower portions 104 and 112 of the die, however, should not directly contact each other via the substrate. The upper and lower portions 104 and 112 of the die are initially positioned such that a predetermined gap (e.g., the same distance) exists uniformly across the surfaces between the upper and lower portions 104 and 112 of the die. Over time, however, such as due to stamping substrates, the upper and/or lower portions 104 and 112 may move. If the upper and lower portions 104 and 112 move such as to touch each other at one or more locations, flex and/or damage may occur to one or more components, such as the die and/or the stamping press.

A plurality of electric motors 120 control the vertical movement. As discussed further below, operation of the electric motors 120 may be controlled by a motor control module 124 to maintain the same distance between the upper and lower portions 104 and 112 of the die during stamping of a substrate at multiple (e.g., all) locations across the upper and lower portions 104 and 112.

Figure 2:
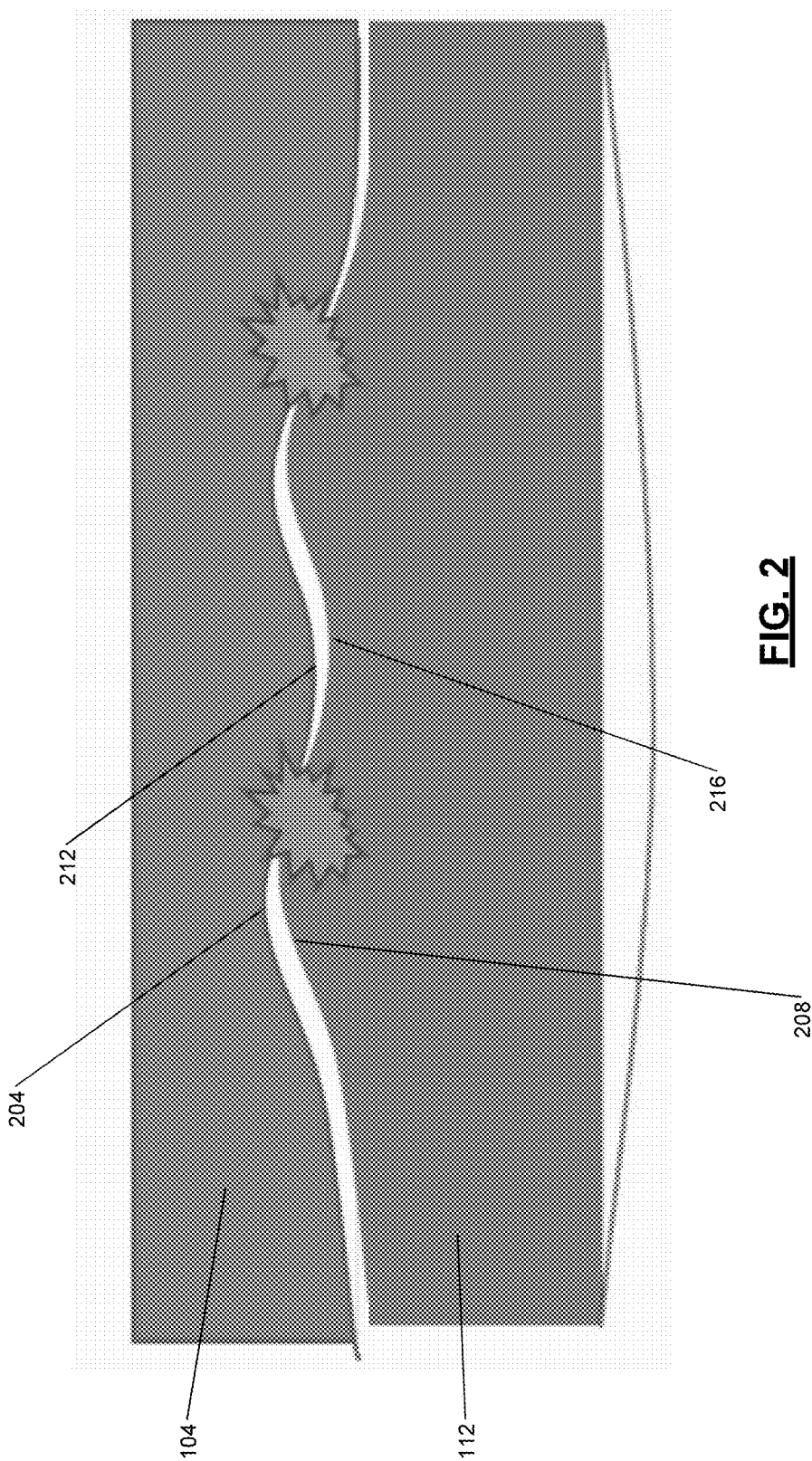
FIG. 2 illustrates a cross-sectional view of a portion of the upper and lower portions of the die of a stamping press.

FIG. 2 illustrates a cross-sectional view of a portion of the upper and lower portions 104 and 112 of the die. The upper portion 104 may include one or more concave features, such as 204. The lower portion 112 may include one or more convex features, such as 208, configured to extend into concave features, respectively, of the upper portion 104. The upper portion 104 may include one or more convex features, such as 212. The lower portion 112 may include one or more concave features, such as 216, configured to extend into convex features, respectively, of the upper portion 104. Stated generally, the upper portion 104 includes first features, and the lower portion 112 includes second features that are complementary to the first features.

If the upper and lower portions 104 and 112 are not properly aligned, however, one or more portions of the upper portion 104 may contact one or more portions of the lower portion 112, such as illustrated in the example of FIG. 2

Figure 3:
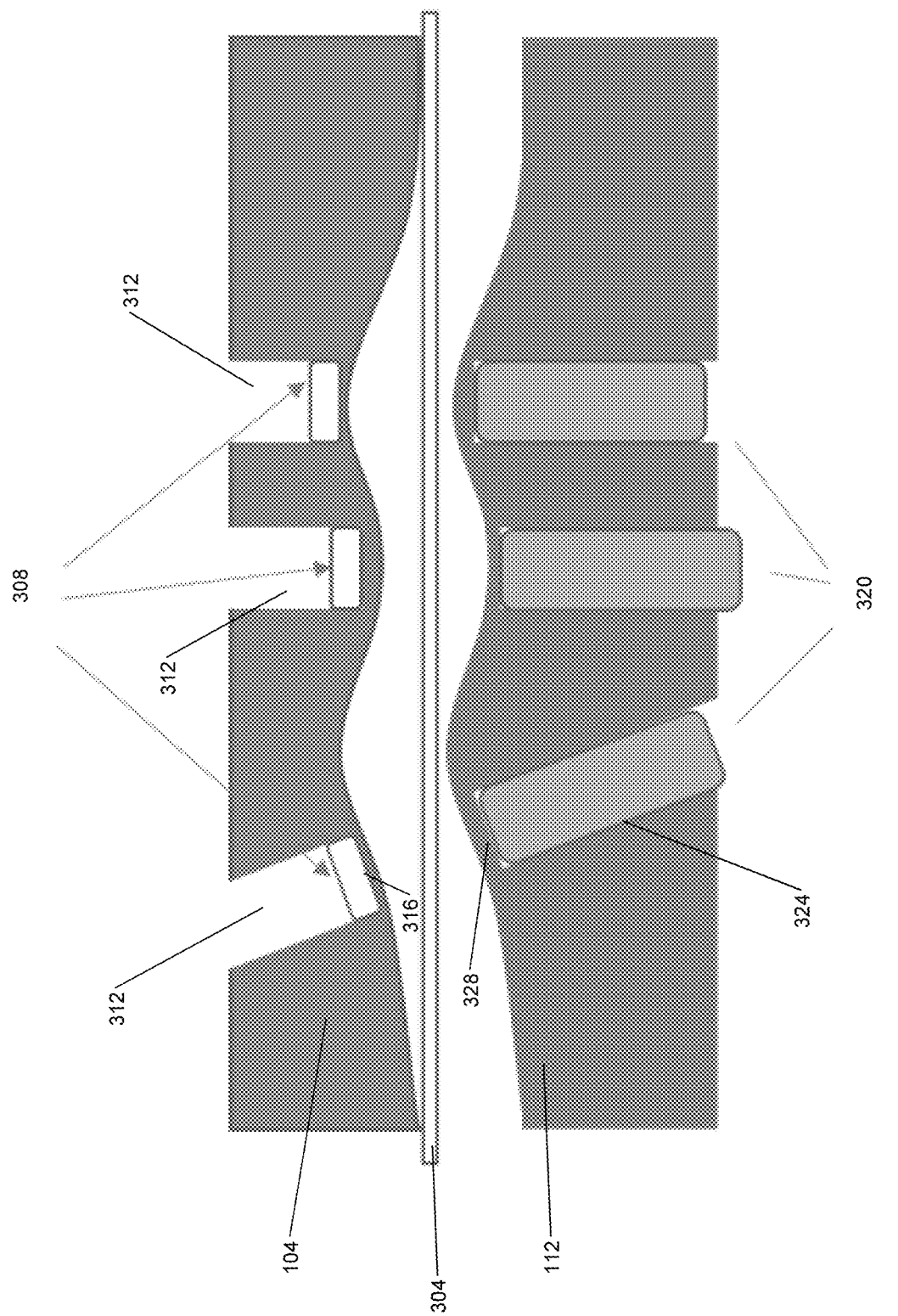
FIG. 3 includes a cross-sectional view of a portion of the upper and lower portions of the die of a stamping press.

FIG. 3 includes a cross-sectional view of a portion of the upper and lower portions of the die of a stamping press according to the present application. An example substrate 304 (e.g., sheet metal) to be stamped is illustrated. As illustrated, magnets 308 (e.g., permanent magnets) are disposed within bores 312 in the upper portion 104 at different locations across the upper portion 104. The magnets 308 may be spaced a predetermined distance from each other, such as every X centimeters in X and Y directions (where the die moves in the Z direction), where X is an integer greater than zero. A plane of a face 316 of each of the magnets may be approximately parallel to a tangent to the upper portion 104 at a center of the location of that magnet. The magnetics 308 may be threaded into threads of the bores 312, adhered within the bores 312 using an adhesive, be magnetically held within the bores 312, or otherwise held within the bores 312.

Magnetic flux sensors 320 are disposed within bores 324 in the lower portion 112 of the die at different locations across the upper portion 104 and adjacent to the magnets 308, respectively. One magnetic flux sensor may be provided for each magnet. The magnetic flux sensors 320 may be spaced a predetermined distance from each other, such as every X centimeters in X and Y directions (where the die moves in the Z direction), where X is an integer greater than zero. A plane of a face 328 of each of the magnetic flux sensors may be approximately parallel to a tangent to the lower portion 112 at a center of the location of that magnetic flux sensor. The magnetic flux sensors 320 may be, for example Hall effect sensors or another suitable type of sensor configured to measure magnetic flux.

The magnetic flux sensors 320 measure magnetic flux (e.g., magnitude) from the adjacent magnets 308, respectively. The magnetic flux measured by a magnetic flux sensor corresponds to a distance between that magnetic flux sensor and the adjacent magnet and therefore the distance between the upper portion 104 at that location and the lower portion at that location. As discussed further below, the distances can be used to generate a map of distances between the upper and lower portions 104 and 112 at various locations across the upper and lower portions 104 and 112.

Figure 4:
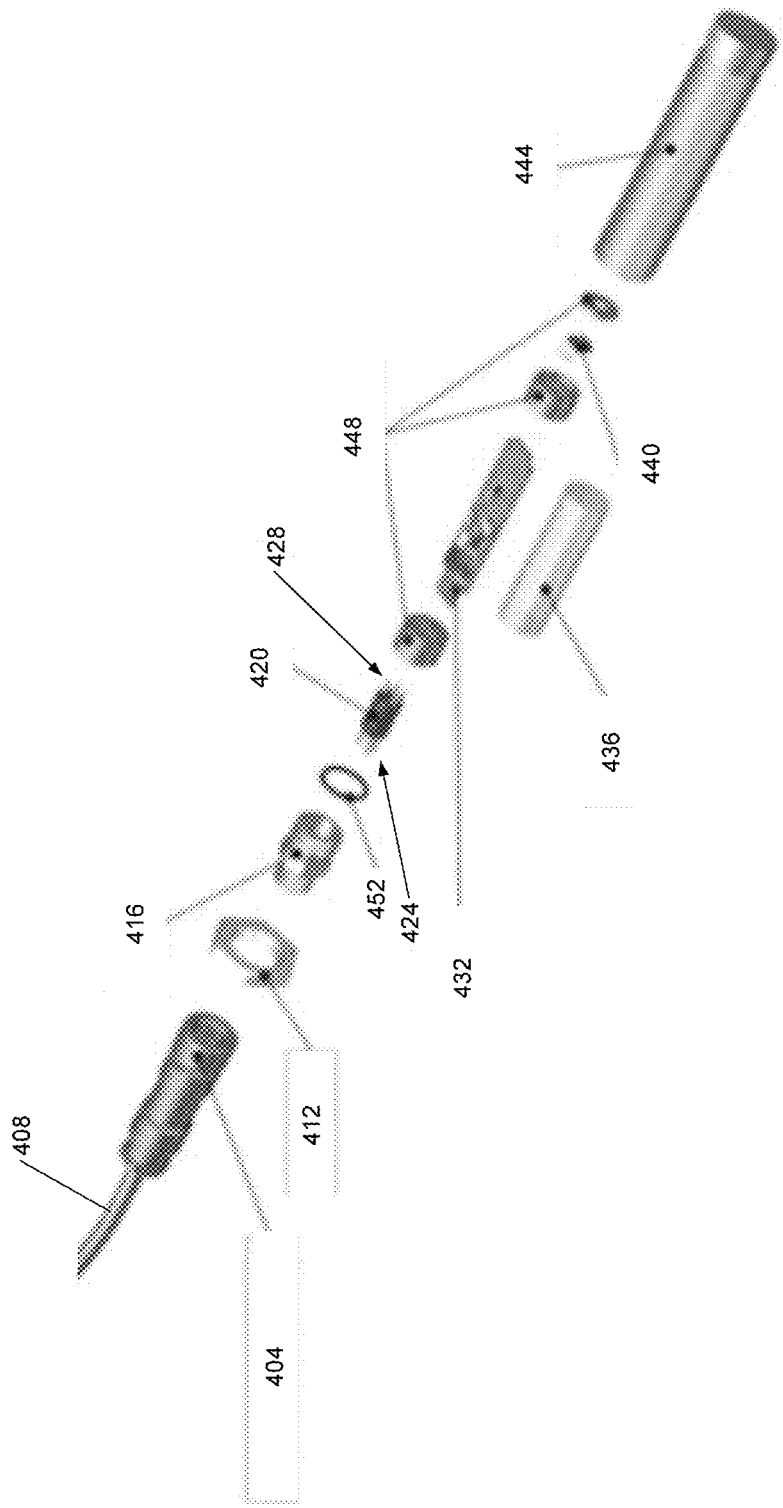
FIG. 4 is a perspective exploded view of an example implementation of a magnetic flux sensors of a lower portion of a die.

FIG. 4 is a perspective exploded view of an example implementation of one of the magnetic flux sensors 320. Each of the magnetic flux sensors 320 may be the same.

The magnetic flux sensor 320 includes a female connector 404 and a wire 408 that is connected to electrically conductive pins of the female connector 404. A nut 412 connects the female connector 404 to a bushing 416. A male connector 420 includes first electrically conductive pins 424 that extend through the bushing and contacts the pins of the female connector 404.

The male connector 420 also includes second electrically conductive pins 428 that are electrically connected with electrical conductors, respectively, of a circuit board 432, such as a printed circuit board (PCB). One or more signal processing modules and other types of modules may be implemented on the circuit board 432 and configured to determine the distance between the upper and lower portions 104 and 112 at that location, such as using a lookup table or an equation that relates magnetic flux to distance. The circuit board 432 and the modules on the circuit board 432 may be encased in a resin 436 or another suitable type of material. The resin 436 may damp vibration and serve one or more other functions.

A magnetic flux sensor (probe) 440 is electrically connected to the modules on the circuit board 432 and is configured to measure magnetic flux and generate signals based on the measured magnetic flux. The sensor 440, the circuit board 432, and the male connector 424 may be disposed within a case 444. Cartridges 448 may center and hold the circuit board 432 and other components within the case 444.

In various implementations, a temperature sensor may be implemented on the circuit board 432 and configured to measure a temperature. The measurements of the magnetic flux sensor 440 may vary based on temperature. A module on the circuit board 432 may therefore adjust the distance based on the temperature, for example, using one of a lookup table and an equation.

The case 444 may be cylindrical and includes threads on an inner diameter of the case 444. The threads on the inner diameter of the case 444 couple the case 444 to the bushing 416. An O-ring 452 or another suitable type of seal may be disposed between an end of the case 444 and a shoulder of the bushing 416 such as to prevent liquid flow to the circuit board 432.

The case 444 also includes threads on an outer diameter of the case 444. The threads on the outer diameter of the case 444 with threads to threads on an inner diameter of a bore 324 in the lower portion of the die.

Figure 5:
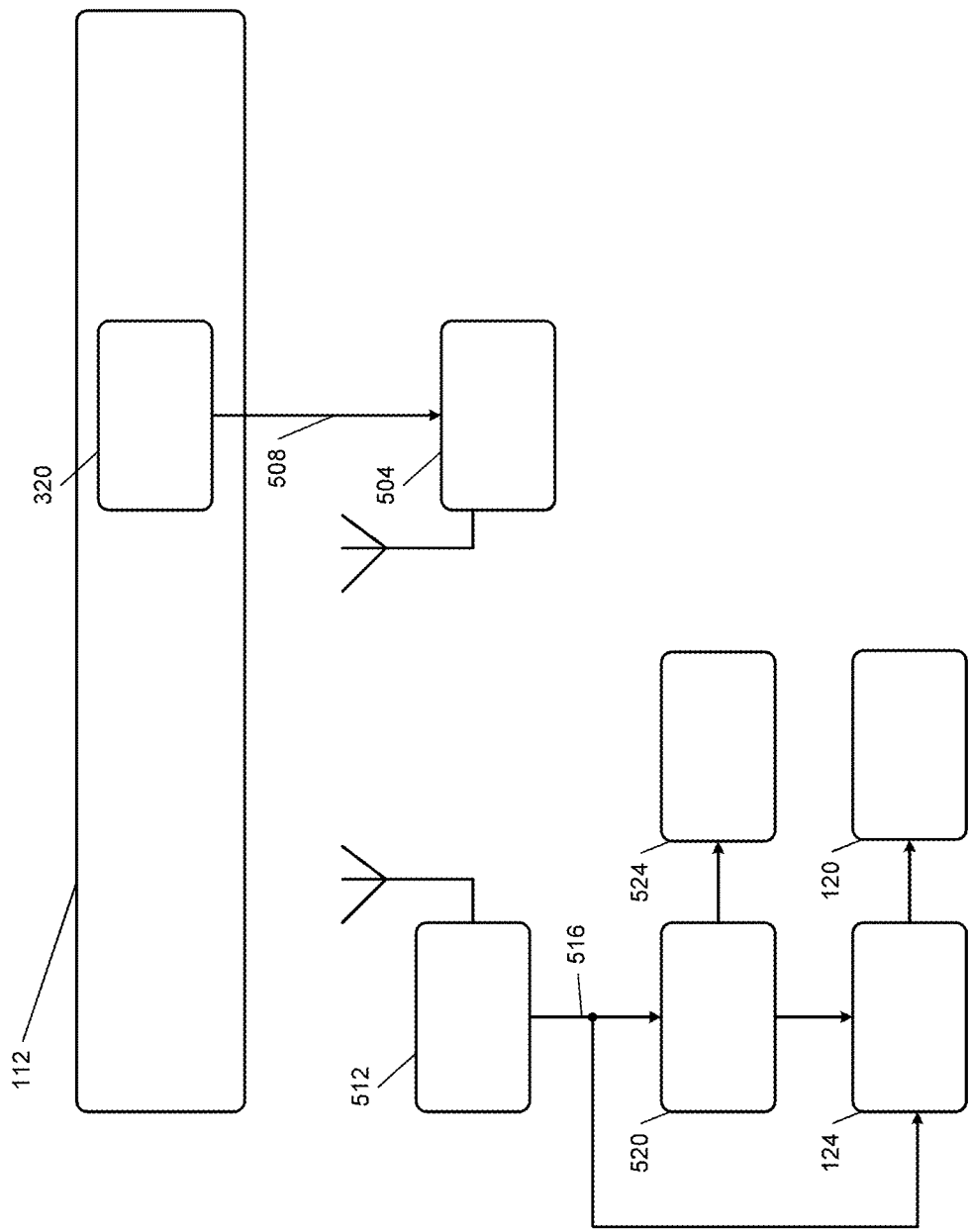
FIG. 5 includes a functional block diagram of an example die alignment system.

FIG. 5 includes a functional block diagram of an example die alignment system. The lower portion 112 of the die includes multiple of the magnetic flux sensors 320.

The stamping press may include a communication module 504 that receives the distances 508 measured by the magnetic flux sensors 320, respectively. The communication module 504 communicates the distances 508 to a gap module 512. For example, the communication module 504 may communicate the distances 508 wirelessly via one or more antennas.

Figure 6:
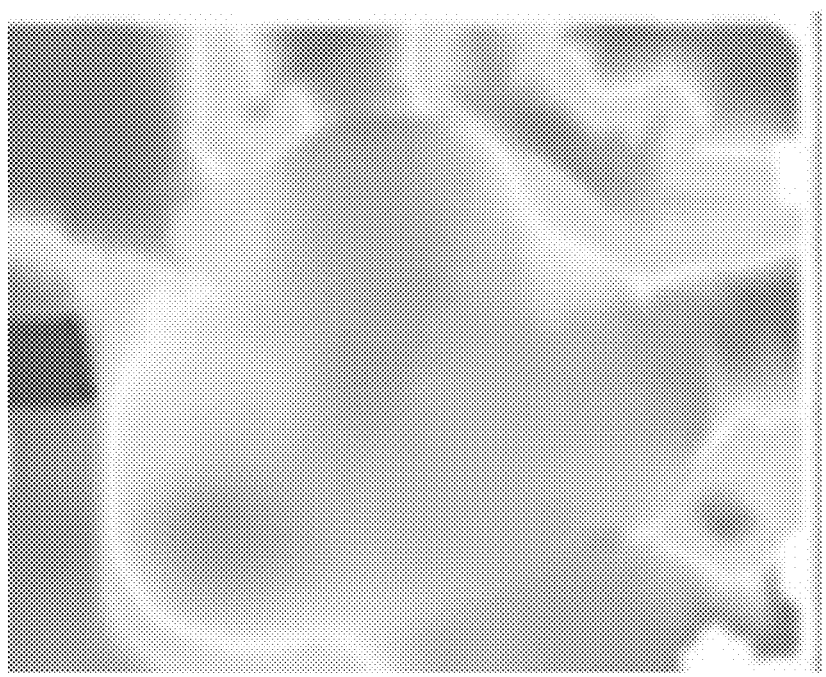
FIG. 6 includes an example gap (distance) map.

The gap module 512 may generate a gap map 516 based on the distances 508 and the locations of the associated magnetic flux sensors 320. The gap map 516 may include, for example, the distances 508 at coordinates of the magnetic flux sensors 320, respectively. The gap module 512 may, for example, interpolate the distance between locations. An example gap map is provided in FIG. 6. In the example of FIG. 6, color may become brighter as distance decreases and color may become darker as distance increases.

One or more actions may be taken based on one or more of the distances 508 and/or the gap map 516. For example, the motor control module 124 may compare the distances 508 and control power application to one or more of the electric motors 120 based on adjusting the distances 508 to be within a predetermined range of each other. This may include, for example, increasing a speed of an electric motor when a distance near that motor is greater than one or more other ones of the distances 508 during stamping. As another example, the motor control module 124 may decrease a speed of an electric motor when a distance near that motor is less than one or more other ones of the distances 508 during stamping. Stated differently, the motor control module 124 may control the electric motors 120 based on achieving gap map that has the same color (indicating the same distance at all locations.

As another example of an action, a fault module 520 may identify the presence of a fault based on the distances 508 and/or the gap map 516. For example, the fault module 520 may identify the presence of a fault when one of the distances 508 is at least a predetermined amount greater than or less than the other distances 508 (e.g., an average) during the stamping. As another example, the fault module 520 may indicate the presence of a fault when the gap map 516 includes a color (e.g., brightness) at one or more locations that is different than the color at the other locations of the gap map 516 by at least a predetermined amount.

The fault module 520 may indicate the presence of a fault visibly or audibly via one or more output devices 524, such as a display, a light/lamp, a speaker, or another suitable type of device that outputs sound and/or light. The fault module 520 may additionally or alternatively indicate the presence of a fault to the motor control module 124. When a fault is present, the motor control module 124 may disconnect the electric motors 120 from power (disable the electric motors 120) and stop the stamping and the vertical movement of the one or more portions of the die.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A stamping press system comprising:
   a die including:
      an upper portion including one or more first features and first bores that extend partially through the upper portion;
      magnets disposed within the first bores, respectively;
      a lower portion including one or more second features that are complementary to the first features and second bores at locations, respectively, that extend partially through the lower portion; and
      magnetic flux sensors that are disposed within the second bores, respectively, and that are adjacent to the magnets, respectively, and that are configured to measure distances between the upper and lower portions at the locations;
   electric motors configured to at least one of:
      vertically lower the upper portion toward the lower portion; and vertically raise the lower portion toward the upper portion; and a motor control module configured to control application of power to the electric motors.

2. The stamping press system of claim 1 wherein the motor control module is configured to control application of power to the electric motors during the at least one of the vertical lowering and the vertical raising based on at least one of the distances.

3. The stamping press system of claim 1 wherein the motor control module is configured to adjust power applied to at least one of the electric motors based on adjusting at least one of the distances toward to at least one other one of the distances.

4. The stamping press system of claim 1 wherein the magnets are adhered within the first bores, respectively.

5. The stamping press system of claim 1 wherein the magnetic flux sensors are threaded onto threads on an inner diameter of the second bores.

6. The stamping press system of claim 1 further comprising a gap module configured to generate a map of the distances at the locations, respectively.

7. The stamping press system of claim 6 wherein the motor control module is configured to control application of power to the electric motors during the at least one of the vertical lowering and the vertical raising based on the map.

8. The stamping press system of claim 1 wherein the magnetic flux sensors include Hall Effect sensors.

9. The stamping press system of claim 1 further comprising a fault module configured to selectively indicate the presence of a fault based on the distances.

10. The stamping press system of claim 9 wherein the fault module is configured to, when the fault is present, indicate the presence of the fault via an output device that at least one of outputs sound and outputs light.

11. The stamping press system of claim 9 wherein the motor control module is configured to disconnect the electric motors from power when fault is present.

12. The stamping press system of claim 1 wherein planes of faces of the magnets are approximately parallel to tangents to the upper portion at centers of the location of the magnets, respectively.

13. A die of a stamping press, the die comprising:
an upper portion including one or more first features and first bores that extend partially through the upper portion;
magnets disposed within the first bores, respectively;
a lower portion including one or more second features that are complementary to the first features and second bores at locations, respectively, that extend partially through the lower portion; and
magnetic flux sensors that are disposed within the second bores, respectively, and that are adjacent to the magnets, respectively, and that are configured to measure distances between the upper and lower portions at the locations.

14. The die of claim 13 wherein the magnets are adhered within the first bores, respectively.

15. The die of claim 13 wherein the magnetic flux sensors are threaded onto threads on an inner diameter of the second bores.

16. The die of claim 13 wherein the magnetic flux sensors include Hall Effect sensors.

17. The die of claim 13 wherein planes of faces of the magnets are approximately parallel to tangents to the upper portion at centers of the location of the magnets, respectively.

18. A method comprising
by electric motors of a stamping press, selectively at least one of:
vertically lowering an upper portion of a die toward a lower portion of the die; and
vertically raising the lower portion of the die toward the upper portion of the die; and
controlling the application of power to the electric motors, the die including:
an upper portion including one or more first features and first bores that extend partially through the upper portion;
magnets disposed within the first bores, respectively;
a lower portion including one or more second features that are complementary to the first features and second bores at locations, respectively, that extend partially through the lower portion; and
magnetic flux sensors that are disposed within the second bores, respectively, and that are adjacent to the magnets, respectively, and that are configured to measure distances between the upper and lower portions at the locations.

19. The method of claim 18 wherein the controlling the application of power to the electric motors includes controlling application of power to the electric motors during the at least one of the vertical lowering and the vertical raising based on at least one of the distances.

20. The method of claim 18 wherein the controlling the application of power to the electric motors includes adjusting power applied to at least one of the electric motors based on adjusting at least one of the distances toward to at least one other one of the distances.

* * * * *